(12) United States Patent
Oyman et al.

(10) Patent No.: US 8,175,042 B2
(45) Date of Patent: May 8, 2012

(54) HARQ SUPPORTED CLIENT RELAY PROTOCOL

(75) Inventors: Ozgur Oyman, Palo Alto, CA (US); Qinghua Li, Sunnyvale, CA (US)

(73) Assignee: Intel Corporation, Sunnyvale, CA (US)

( * ) Notice: Subject to any disclaimer, the term of this patent is extended or adjusted under 35 U.S.C. 154(b) by 654 days.

(21) Appl. No.: 11/926,952

(22) Filed: Oct. 29, 2007

(65) Prior Publication Data
US 2009/0109892 A1    Apr. 30, 2009

(51) Int. Cl.
*H04W 4/00* (2009.01)
(52) U.S. Cl. ............................... 370/329; 370/338
(58) Field of Classification Search .......... 370/200–253, 370/331, 351, 315–327, 492–497, 501–545, 370/329–338; 714/748; 455/7
See application file for complete search history.

(56) References Cited

U.S. PATENT DOCUMENTS

| | | | |
|---|---|---|---|
| 2007/0190933 A1* | 8/2007 | Zheng et al. ...................... 455/7 |
| 2007/0280168 A1* | 12/2007 | Shibata .......................... 370/331 |
| 2008/0049718 A1* | 2/2008 | Chindapol et al. ............ 370/351 |
| 2008/0282126 A1* | 11/2008 | Chindapol et al. ............ 714/748 |
| 2009/0010198 A1* | 1/2009 | Boariu et al. ................. 370/315 |
| 2009/0060010 A1* | 3/2009 | Maheshwari et al. ........ 375/211 |

* cited by examiner

*Primary Examiner* — Pao Sinkantarakorn
*Assistant Examiner* — Iqbal Zaidi
(74) *Attorney, Agent, or Firm* — Cool Patent, P.C.; Kenneth J. Cool; Joseph P. Curtin

(57) ABSTRACT

Briefly, in accordance with one or more embodiments, in a HARQ supported client relaying wireless network, if the intended client subscriber station is able to decode the transmission from the base station, an allocated data zone otherwise allocated for relay transmission and acknowledgment zones in the uplink subframe can be used by another client station for uplink transmission. If the intended client subscriber station cannot decode the transmission from the base station but the relay station can, the relay station may use the allocated data zone in the uplink subframe in which to transmit a relay transmission, along with acknowledgment transmissions in the acknowledgment zones. If the relay station also cannot decode the base station transmission, the other client station may use the allocated data otherwise allocated for relay transmission and acknowledgment zones for uplink transmission.

17 Claims, 5 Drawing Sheets

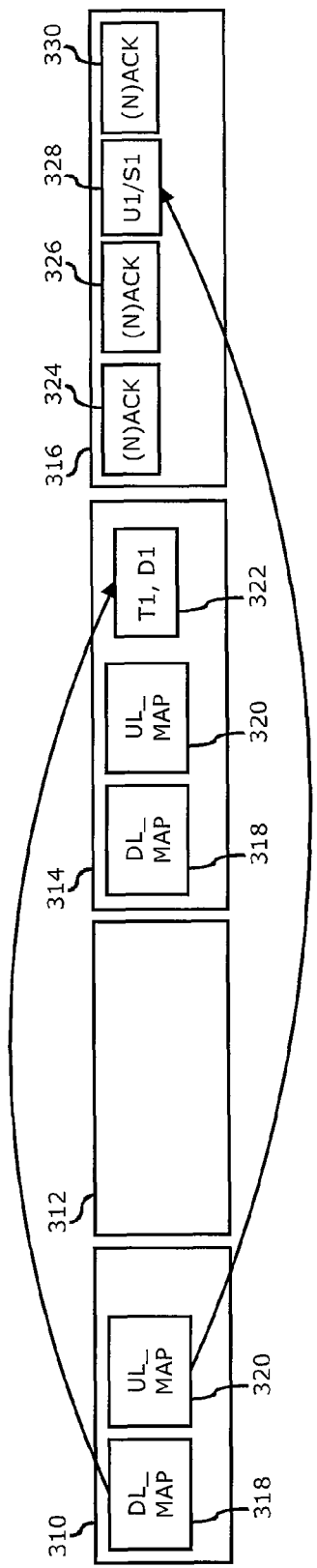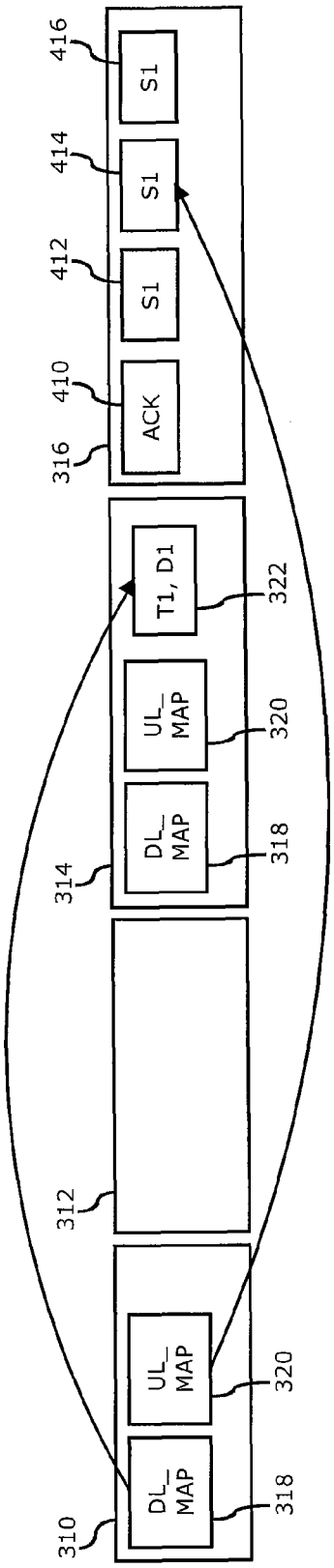

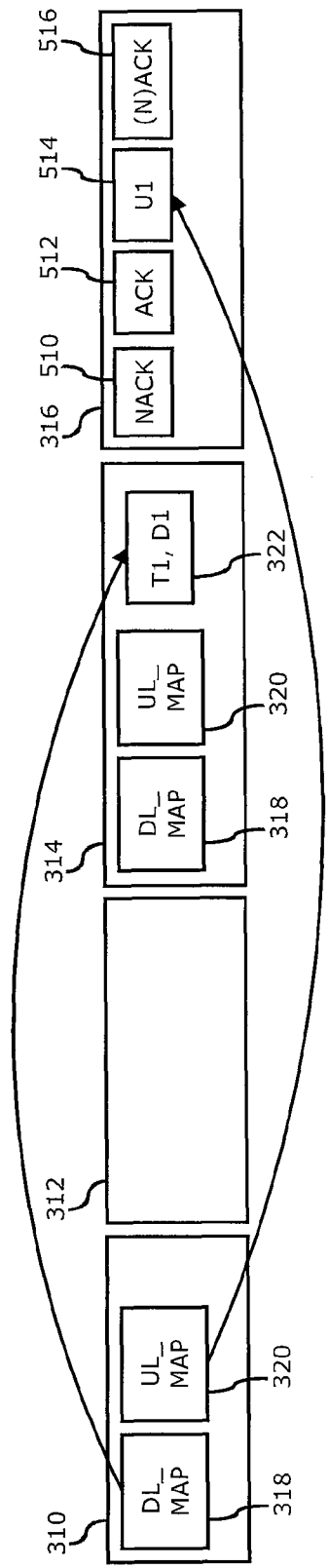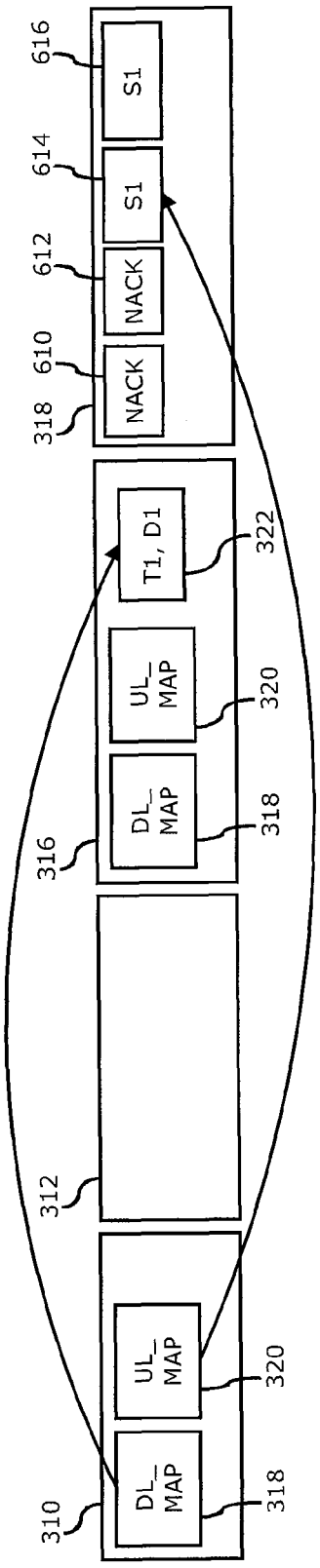

HARQ SUPPORTED CLIENT RELAY PROTOCOL

BACKGROUND

To overcome fading, wireless networks typically may employ diversity techniques, for example, channel interleavers, multiple antennas, frequency-hopping, and so on. Some systems may utilize cooperative diversity in which users partner in sharing their antennas and other resources to create a virtual array through distributed transmission and signal processing. However, in a slow fading environment, a burst of error may significantly degrade error performance and thus negatively impact the reliable decoding of the received signal. If the system can tolerate a certain delay, retransmitting the signal using Automatic repeat request (ARQ) protocols may help to enhance communication reliability. In Hybrid ARQ (HARQ) protocols, error detection and correction may be combined in order to obtain better reliability and throughput. Cooperative diversity concepts can further increase the performance of HARQ protocols. In this setting, when the initial frame decoding attempt at the receiving end fails, another transmitter, designated as the cooperating relay, performs signal retransmission over a higher-quality channel. This approach guarantees that the destination terminal receives an independently-faded version of the frame after retransmission from the cooperating relay, increasing the likelihood of reliable decoding at the receiver, and reducing the expected number of retransmissions necessary for successful decoding of the transmitted message.

Frame structures and transmission mechanisms may be implemented to enable client relay functionality, relaying executed by the mobile stations, in the next version of Worldwide Interoperability for Microwave Access (WiMax2) networks while also meeting requirements of the Institute of Electrical and Electronics Engineers (IEEE) 802.16m standard and ensuring compatibility and minimal impact to implementing the IEEE 802.16e standard. In such a setting, in the case of a downlink transmission by the base station to a particular intended subscriber station, another subscriber station, designated as the client relay, can decode the base station's transmission and transmit a reencoded version to the intended subscriber station in the uplink subframe and thereby enable the intended subscriber station to enjoy better quality of service. In such client relaying, the link between the base station and client relay station and the link between the client relay station and the intended subscriber station typically have much better channel quality than the link between base station and intended subscriber station. By enabling the intended subscriber station to receive multiple faded copies of the signal transmission from the base station, the use of client relaying leads to a better end-to-end throughput performance through cooperative diversity gains.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

FIG. 3 is a timing diagram of the wireless network of FIG. 2 capable of utilizing HARQ-supported client relaying in accordance with one or more embodiments;

FIG. 4 is a timing diagram of a HARQ-supported client relaying network where the intended client receiver is capable of decoding an initial downlink transmission in accordance with one or more embodiments;

FIG. 5 is a timing diagram of a HARQ-supported client relaying network where the intended client receiver is unable to decode an initial downlink transmission, but the client relay terminal is capable of decoding the initial downlink transmission accordance with one or more embodiments;

FIG. 6 is a timing diagram of a HARQ-supported client relaying network where neither the intended client receiver nor the client relay terminal is capable of decoding an initial downlink transmission in accordance with one or more embodiments.

Figure 1:
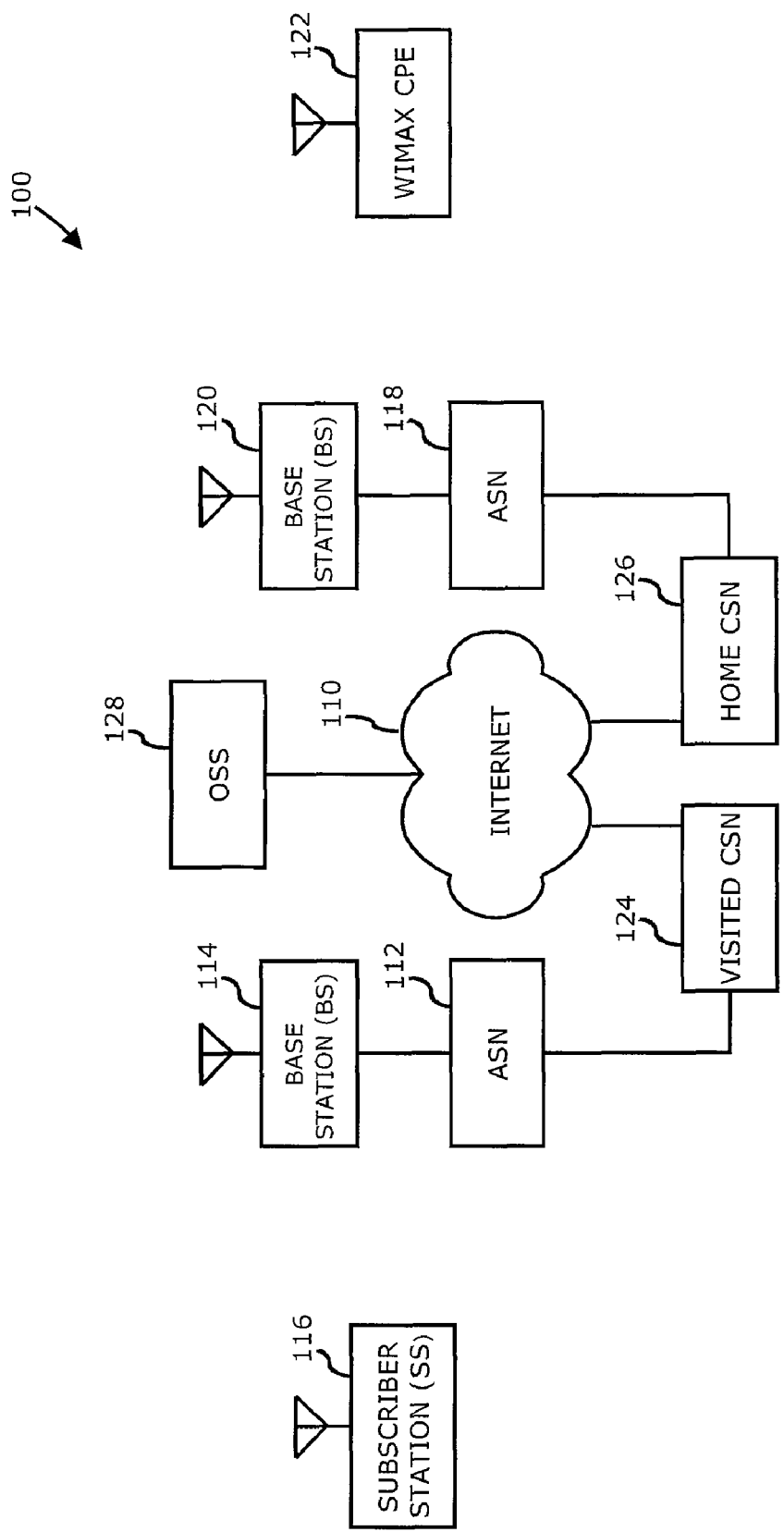
FIG. 1 is a diagram of a wireless network in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a block diagram of a wireless network in accordance with one or more embodiments will be discussed. As shown in FIG. 1, network 100 may be an Internet Protocol (IP) type network comprising an internet-type network 110, or the like, that is capable of supporting mobile wireless access and/or fixed wireless access to internet 110: In one or more embodiments, network 100 may be in compliance with a Worldwide Interoperability for Microwave Access (WiMAX) standard or future generations of WiMAX, and in one particular embodiment may be in compliance with an Institute for Electrical and Electronics Engineers 802.16e standard (IEEE 802.16e). In one or more alternative embodiments network 100 may be in compliance with a Third Generation Partnership Project Long Term Evolution (3GPP LTE) or a 3GPP2 Air Interface Evolution (3GPP2 AIE) standard. In general, network 100 may comprise any type of orthogonal frequency division multiple access (OFDMA) based wireless network, and the scope of the claimed subject matter is not limited in these respects. As an example of mobile wireless access, access service network (ASN) 112 is capable of coupling with base station (BS) 114 to provide wireless communication between subscriber station (SS) 116 and internet 110. Subscriber station 116 may comprise a mobile-type device or information handling system capable of wirelessly communicating via network 100, for example, a notebook-type computer, a cellular telephone, a personal digital assistant, or the like. ASN 112 may implement profiles that are capable of defining the mapping of network functions to one or more physical entities on network 100. Base station 114 may comprise radio equipment to provide radio-frequency (RF) communication with subscriber station 116, and may comprise, for example, the physical layer (PHY) and media access control (MAC) layer equipment in compliance with an IEEE 802.16e type standard. Base station 114 may further comprise an IP backplane to couple to internet 110 via ASN 112, although the scope of the claimed subject matter is not limited in these respects.

Network 100 may further comprise a visited connectivity service network (CSN) 124 capable of providing one or more network functions including, but not limited to proxy and/or relay type functions, for example, authentication, authorization and accounting (AAA) functions, dynamic-host configuration protocol (DHCP) functions, or domain name service controls or the like, domain gateways, such as public switched telephone network (PSTN) gateways or Voice Over Internet Protocol (VOIP) gateways, and/or Internet Protocol (IP) type server functions, or the like. However, these are merely example of the types of functions that are capable of being provided by visited CSN or home CSN 126, and the scope of the claimed subject matter is not limited in these respects. Visited CSN 124 may be referred to as a visited CSN in the case, for example, in which visited CSN 124 is not part of the regular service provider of subscriber station 116, for example, in which subscriber station 116 is roaming away from its home CSN, such as home CSN 126, or for example, in which network 100 is part of the regular service provider of subscriber station, but where network 100 may be in another location or state that is not the main or home location of subscriber station 116. In a fixed wireless arrangement, WiMAX-type customer premises equipment (CPE) 122 may be located in a home or business to provide home or business customer broadband access to internet 110 via base station 120, ASN 118, and home CSN 126 in a manner similar to access by subscriber station 116 via base station 114, ASN 112, and visited CSN 124, a difference being that WiMAX CPE 122 is generally disposed in a stationary location, although it may be moved to different locations as needed, whereas subscriber station may be utilized at one or more locations if subscriber station 116 is within range of base station 114, for example. In accordance with one or more embodiments, operation support system (OSS) 128 may be part of network 100 to provide management functions for network 100 and to provide interfaces between functional entities of network 100. Network 100 of FIG. 1 is merely one type of wireless network showing a certain number of the components of network 100, however the scope of the claimed subject matter is not limited in these respects.

Figure 2:
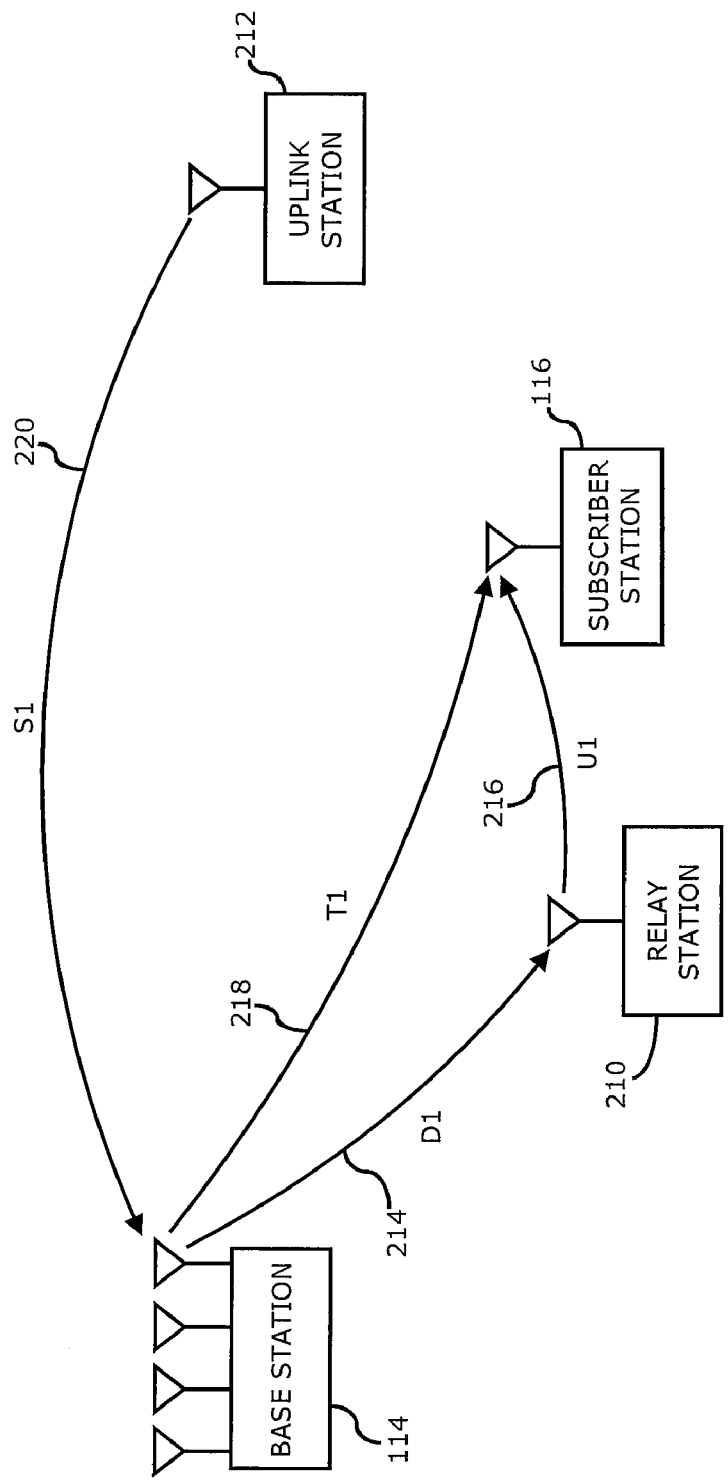
FIG. 2 is a diagram of a wireless network capable of utilizing HARQ-supported client relaying in accordance with one or more embodiments.

Referring now FIG. 2, a diagram of a wireless network capable of utilizing HARQ-supported client relaying in accordance with one or more embodiments will be discussed. In one or more embodiments, prior to downlink transmission to intended client receiver terminal, which in FIG. 2 is shown as subscriber station 116, base station 114 designates client relay station 210 to assist its downlink communication with subscriber station 116 based at least in part on certain relay selection criteria. Moreover, as shown in FIG. 3, below, base station 114 specifies in downlink map (DL-MAP) 318 and uplink map (UL-MAP) 320 of Downlink Subframe1 310, the corresponding zones in Downlink Subframe2 314 and Uplink Subframe2 316 that will be dedicated for the execution of the HARQ-supported client relay protocol. In general, in the timing diagrams discussed herein, time flows along the horizontal direction, whereas frequency changes along the vertical direction. Base station 114 utilizes downlink map 318 and uplink map 320 to tell its clients at what time and frequency to expect transmission and reception of data. Uplink Subframe1 312 occurs after Downlink Subframe1 310 and before Downlink Sub-frame2 314. Additional downlink map 318 and uplink map 320 may be transmitted in Downlink Subframe2 314, although the scope of the claimed subject matter is not limited in this respect. In particular, base station 114 allocates a zone (TI, D1) 322 in Downlink Subframe2 314 for the data transmission of base station 114 over link TI 218 to intended destination subscriber station 116, which will also be heard by the client relay station 210 over link D1 214. Base station 114 also allocates a zone (U1/S1) 328 in Uplink Subframe2 316 for one of two potential transmissions, in which the ACKNACK message exchanges during the execution of the cooperative HARQ protocol determine which transmission will take place in this zone: relay data transmission over link U1 216 from client relay station 210 to intended destination subscriber station 116, or uplink data transmission by another client terminal uplink station 212 over link S1 220. Moreover base station 114 also allocates zones in the uplink subframe for ACK/NACK messages ((N)ACK) 324, 326, and/or 330 sent by the intended client destination subscriber station 116 and/or client relay station 210. It is assumed that the ACK/NACK messaging during the execution of the HARQ-supported client relaying protocol can be heard by base station 114 as well as the client terminals intended subscriber station 116, relay station 210, and/or uplink station 212. It should be noted that the transmissions of the client devices are in the uplink subframe, such as Uplink Subframe2 316, for the examples described, below, and that in one or more embodiments, such uplink transmissions are compatible with an Institute of Electrical and Electronics Engineers (IEEE) 802.16e standard, although the scope of the claimed subject matter is not limited in these respects.

Referring now to FIG. 4, a timing diagram of a HARQ-supported client relaying network in which the intended client receiver is capable of decoding an initial downlink transmission in accordance with one or more embodiments will be discussed. Consider the downlink transmission from the base station 114 to intended client subscriber station 116 assisted by client relay station 210 as depicted in FIG. 2 and FIG. 3. Base station 114 sends data to both the relay station 210 and the destination subscriber station 116 in Downlink Subframe2 314 over links D1 214 and T1 218, respectively. After receiving the data in the downlink subframe, the intended client subscriber station 116 and client relay station 210 both attempt to decode their respective received signals. If the decoding attempt of intended client subscriber station 116 is successful, then subscriber station 116 transmits an ACK message 410 in Uplink Subframe2 316 to acknowledge to base station 114, to relay station 210 and to uplink station 212 the successful receipt of the downlink data. The receipt of the ACK message 410 informs the client relay station 210 that its retransmission during Uplink Subframe2 316 is not needed. Moreover, the receipt of the ACK message 410 informs base station 114 that uplink station 212 will be transmitting in the allocated uplink data zone and the acknowledgement zone of relay station 210 and second acknowledgement zone of destination station 116, and allows uplink station 212 to transmit its message or messages 412, 414, and/or 416 over link Si 220 to base station 114 over these corresponding zones in Uplink Subframe2 316, as depicted in FIG. 4. Thus, in one or more embodiments, when intended client receiver subscriber station 116 is capable of decoding the initial downlink transmission by base station 114 over link T1 218, the allocated data and acknowledgment zones in Uplink Subframe2 316 may be utilized by client uplink station 212 for uplink transmissions over link S1 220, although the scope of the claimed subject matter is not limited in this respect.

Referring now to FIG. 5, a timing diagram of a HARQ-supported client relaying network in which the intended client receiver 116 is unable to decode an initial downlink transmission from the base station 114, but the client relay terminal 210 is capable of decoding the initial downlink transmission accordance with one or more embodiments will be discussed. In one or more embodiments, if the intended client terminal subscriber station 116 cannot decode the downlink data sent by base station 114 over link T1 218, subscriber station 116 will send out a NACK message 510. After transmission of NACK message 510 by subscriber station 116, client relay station 210 will inform the other terminals, for example, base station 114 and client terminals subscriber station 116 and uplink terminal 212, on whether the decoding attempt by client relay station 210 of the downlink signal it received over link D1 214 was successful via an ACK/NACK message. If relay station 210 has decoded successfully and transmits ACK message 512, then the allocated data zone 514 of Uplink Subframe2 316 is used by relay station 210 to send a reencoded version of its received downlink signal to the intended client subscriber station 116 over link U1 216, as depicted in FIG. 5. Following the reception of the data from client relay station 210, intended client receiver subscriber station 116 now has two copies of the intended downlink signal transmitted from base station 114 and can make a second decoding attempt after combining these two copies of the transmitted signal for higher reliability reception, for example, by using chase combining The destination terminal subscriber station 116 then sends out an ACK/NACK message 516 to inform base station 114 about the outcome of the second decoding attempt on the transmitted downlink information. Thus, in one or more embodiments if the intended client subscriber station 116 is unable to decode an initial downlink transmission transmitted by base station 114 via link T1 218, but client relay station 210 is capable of decoding the initial downlink transmission, data zone 514 of Uplink Subframe2 316 may be utilized by client relay station 210 to relay the data received from base station 114 to destination subscriber station 116 via link U1 216, although the scope of the claimed subject is not limited in this respect.

Referring now to FIG. 6, a timing diagram of a HARQ-supported client relaying network in which neither the intended client receiver 116 nor the client relay terminal 210 is capable of decoding an initial downlink transmission in accordance with one or more embodiments will be discussed. In one or more embodiments, if neither the intended client subscriber station 116 nor the client relay station 210 can successfully decode the downlink data sent from base station 114, in which subscriber station 116 transmits NACK message 610 and relay station 210 transmits NACK message 612, then the allocated data zone 614 in Uplink Subframe2 will not be used for relay transmission. Instead, zone 614 and the last acknowledgement zone 616, sometimes dedicated for ACK/NACK messaging of subscriber station 116 after a second decoding attempt as discussed with respect to FIG. 5, both may be used by the client uplink station 212 to transmit its uplink information over link S1 220, as depicted in FIG. 6. Thus, in one or more embodiments, if neither subscriber station 116 nor relay station 210 is capable of decoding the initial downlink transmission from base station 114, uplink station 212 may use available zones 614 and/or 616 for its uplink transmission, although the scope of the claimed subject matter is not limited in this respect.

Figure 7:
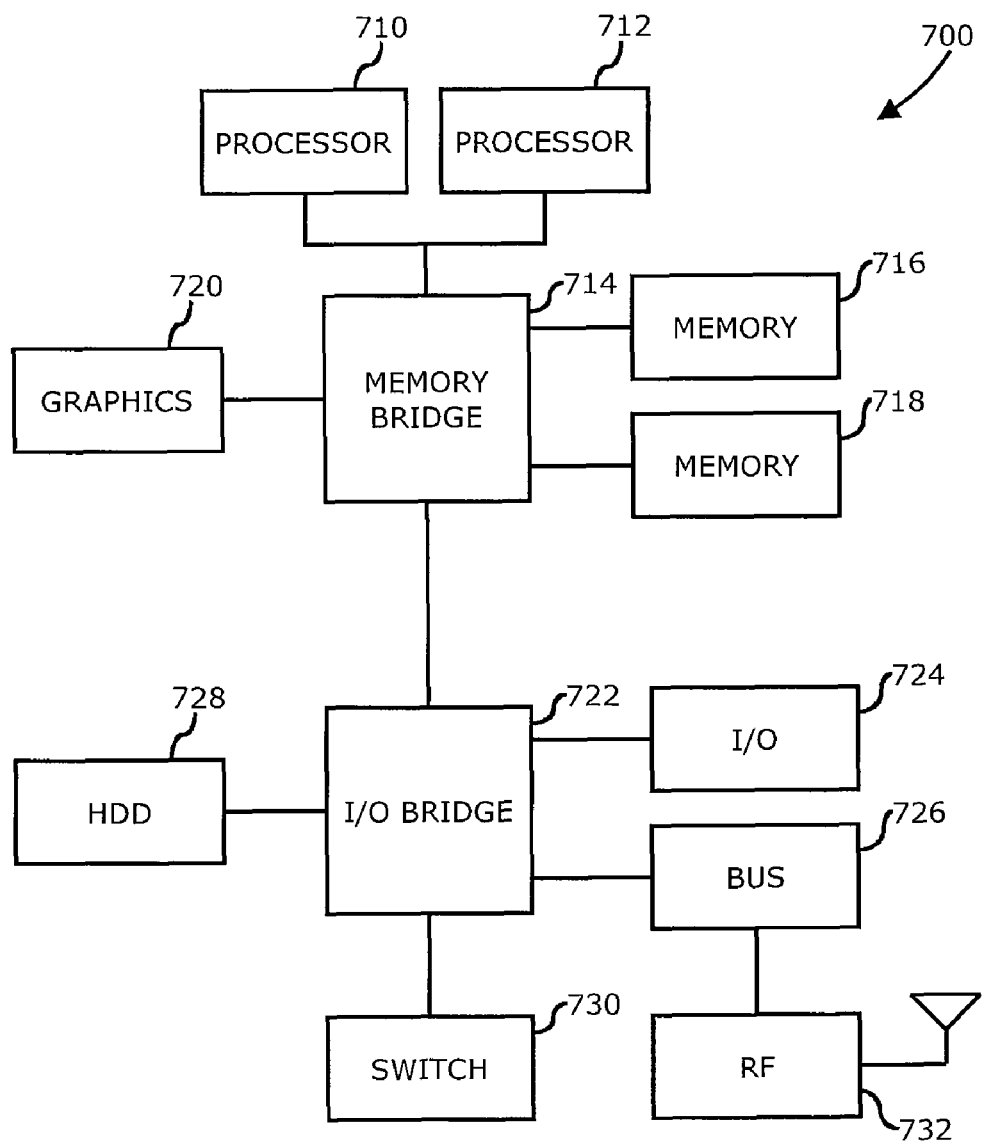
FIG. 7 is a block diagram of an information handling system in accordance with one or more embodiments.

Referring now to FIG. 7, a block diagram of an information handling system in accordance with one or more embodiments will be discussed. Information handling system 700 of FIG. 7 may tangibly embody one or more of any of the network elements of network 100 as shown in and described with respect to FIG. 1 or FIG. 2. For example, information handling system 700 may represent the hardware of base station 114 and/or subscriber station 116, and/or may represent the hardware of relay station 210 and/or uplink station 212, with greater or fewer components depending on the hardware specifications of the particular device or network element. Although information handling system 700 represents one example of several types of computing platforms, information handling system 700 may include more or fewer elements and/or different arrangements of elements than shown in FIG. 7, and the scope of the claimed subject matter is not limited in these respects.

Information handling system 700 may comprise one or more processors such as processor 710 and/or processor 712, which may comprise one or more processing cores. One or more of processor 710 and/or processor 712 may couple to one or more memories 716 and/or 718 via memory bridge 714, which may be disposed external to processors 710 and/or 712, or alternatively at least partially disposed within one or more of processors 710 and/or 712. In one or more embodiments, processor 710 and/or processor 712 may comprise a baseband processor of a radio-frequency (RF) information handling system. Memory 716 and/or memory 718 may comprise various types of semiconductor based memory, for example volatile type memory and/or non-volatile type memory. Memory bridge 714 may couple to a graphics system 720 to drive a display device (not shown) coupled to information handling system 700.

Information handling system 700 may further comprise input/output (I/O) bridge 722 to couple to various types of I/O systems. I/O system 724 may comprise, for example, a universal serial bus (USB) type system, an IEEE 1394 type system, or the like, to couple one or more peripheral devices to information handling system 700. Bus system 726 may comprise one or more bus systems such as a peripheral component interconnect (PCI) express type bus or the like, to connect one or more peripheral devices to information handling system 700. A hard disk drive (HDD) controller system 728 may couple one or more hard disk drives or the like to information handling system, for example Serial ATA type drives or the like, or alternatively a semiconductor based drive comprising flash memory, phase change, and/or chalcogenide type memory or the like. Switch 730 may be utilized to couple one or more switched devices to I/O bridge 722, for example Gigabit Ethernet type devices or the like. Furthermore, as shown in FIG. 7, information handling system 700 may include a radio-frequency (RF) block 732, optionally controllable by processor 710 and/or processor 712, and comprising RF circuits and devices for wireless communication with other wireless communication devices and/or via wireless networks such as network 100 of FIG. 1, for example where information handling system 700 embodies base station 114 and/or subscriber station 116, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to a HARQ supported client relay protocol and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    transmitting a downlink transmission to an intended client station and an intended relay station;
    if an acknowledgment is received from the intended client station that the intended client station has successfully decoded the downlink transmission, allowing another client station to transmit in an allocated data zone otherwise allocated for relay transmission, or in an acknowledgment zone, or combinations thereof, of an uplink subframe, the allocated data zone of the uplink subframe being previously allocated for relay transmission of the downlink transmission from the intended relay station to the intended client station, and the acknowledgement zone of the uplink subframe being previously allocated to the intended relay station for indicating successful or unsuccessful decoding of the downlink transmission by the intended relay station, the another client station not being the intended relay station,
    if a negative acknowledgment is received from the intended client station regarding decoding of the downlink transmission, and if an acknowledgment is received from the intended relay station that the relay station has successfully decoded the downlink transmission, allowing the relay station to transmit a relay transmission in the allocated data zone of the uplink subframe, and
    if a negative acknowledgment is received from the intended client station regarding decoding of the downlink transmission, and if a negative acknowledgment is received from the intended relay station regarding decoding of the downlink transmission, allowing the other client terminal to transmit in an allocated data zone or acknowledgment zone, or combinations thereof, of an uplink subframe.

2. A method as claimed in claim 1, wherein the acknowledgment comprises a hybrid automatic repeat request (HARQ) acknowledgment.

3. A method as claimed in claim 1, said allowing comprising allowing the other client station to transmit in an acknowledgment zone of a relay station, or the intended client station, or combinations thereof.

4. A method as claimed in claim 1, wherein the negative acknowledgment comprises a hybrid automatic repeat request (HARQ) negative acknowledgment.

5. A method as claimed in claim 1, further comprising allowing the intended client station to transmit an acknowledgment or negative acknowledgement regarding the successful decoding of the downlink transmission or the relay transmission, or combinations thereof, in the acknowledgment zone of the uplink subframe.

6. A method as claimed in claim 1, wherein allowing the another client station to transmit in the allocated data zone otherwise allocated for relay transmission, or in the acknowledgment zone, or combinations thereof, of the uplink subframe comprises allowing the another client station to transmit an uplink data transmission in the allocated data zone otherwise allocated for relay transmission, or in the acknowledgment zone, or combinations thereof, of the uplink subframe.

7. A method, comprising:
    receiving at a client station a downlink transmission from a base station intended for the client station and intended for a relay station associated with the client station;
    decoding at the client station the downlink transmission;
    transmitting from the client station an acknowledgment or negative acknowledgment to the base station regarding whether said decoding is successful; and
    if said decoding is successful and the client stations transmits an acknowledgement, allowing another client station to transmit in an allocated data zone otherwise allocated for relay transmission, or in an acknowledgment zone, or combinations thereof, of an uplink subframe, the allocated data zone of the uplink subframe being previously allocated for relay transmission of the downlink transmission from the intended relay station to the intended client station, and the acknowledgement zone of the uplink subframe being previously allocated to the intended relay station for indicating successful or unsuccessful decoding of the downlink transmission by the intended relay station, the another client station not being the relay station associated with the client station,
    if said decoding is not successful,
        receiving at the relay station associated with the client station a negative acknowledgment from the client station regarding the client station decoding the downlink transmission, and
        transmitting from the relay station a relay transmission of the downlink transmission to the client station in the allocated data zone of the uplink subframe,
        receiving at the client station the relay transmission of the downlink transmission from the relay station associated with the client station,
        executing at the client station said decoding again based at least in part on the downlink transmission or the relay transmission, or combinations thereof, and
        transmitting from the client station an acknowledgment or negative acknowledgment to the base station regarding whether said executing said decoding again is successful in the acknowledgment zone of the uplink subframe.

8. A method as claimed in claim 7, wherein the acknowledgment or negative acknowledgment comprises a hybrid automatic repeat request (HARQ) acknowledgment or negative acknowledgment.

9. A method as claimed in claim 7, further comprising:
receiving an acknowledgment or a negative acknowledgment from the client station regarding a second attempt at decoding the downlink transmission or the relay transmission, or combinations thereof.

10. A method as claimed in claim 7, further comprising:
if said decoding is not successful, withholding uplink transmission in the uplink subframe to allow a relay transmission or an acknowledgment transmission, or combinations thereof, to occur in the uplink subframe.

11. A method as claimed in claim 7, wherein allowing the another client station to transmit in the allocated data zone otherwise allocated for relay transmission, or in the acknowledgment zone, or combinations thereof, of the uplink subframe comprises allowing the another client station to transmit an uplink data transmission in the allocated data zone otherwise allocated for relay transmission, or in the acknowledgment zone, or combinations thereof, of the uplink subframe.

12. An apparatus, comprising:
a baseband processor; and
a radio-frequency transceiver coupled to said baseband processor, wherein the baseband processor is configured to control said radio-frequency transceiver to:
transmit a downlink transmission to an intended client station and to an intended relay station associated with the intended client station; and
allow another client station to transmit in an allocated data zone otherwise allocated for relay transmission, or in an acknowledgment zone, or combinations thereof, of an uplink subframe if an acknowledgment is received from the intended client station that the intended client station has successfully decoded the downlink transmission, the allocated data zone of the uplink subframe being previously allocated for relay transmission of the downlink transmission from the intended relay station to the intended client station, and the acknowledgement zone of the uplink subframe being previously allocated to the intended relay station for indicating successful or unsuccessful decoding of the downlink transmission by the intended relay station, the another client station not being the relay station associated with the client station,
allow the relay station to transmit a relay transmission in the allocated data zone of the uplink subframe if a negative acknowledgment is received from the intended client station regarding decoding of the downlink transmission, and if an acknowledgment is received from the intended relay station that the relay station has successfully decoded the downlink transmission, and
allow the other client terminal to transmit in an allocated data zone or acknowledgment zone, or combinations thereof, of an uplink subframe if a negative acknowledgment is received from the intended client station regarding decoding of the downlink transmission, and if a negative acknowledgment is received from the intended relay station regarding decoding of the downlink transmission.

13. An apparatus station as claimed in claim 12, wherein the acknowledgment comprises a hybrid automatic repeat request (HARQ) acknowledgment.

14. An apparatus as claimed in claim 12, wherein the baseband processor is configured to allow the another client station to transmit in an acknowledgment zone of the relay station associated with the intended client station, or the intended client station, or combinations thereof.

15. An apparatus as claimed in claim 12, wherein the negative acknowledgment comprises a hybrid automatic repeat request (HARQ) negative acknowledgment.

16. An apparatus as claimed in claim 12, wherein the baseband processor is further configured to allow the intended client station to transmit an acknowledgment or negative acknowledgement regarding the successful decoding of the downlink transmission or the relay transmission, or combinations thereof, in the acknowledgment zone of the uplink subframe.

17. An apparatus as claimed in claim 12, wherein allowing the another client station to transmit in the allocated data zone otherwise allocated for relay transmission, or in the acknowledgment zone, or combinations thereof, of the uplink subframe comprises allowing the another client station to transmit an uplink data transmission in the allocated data zone otherwise allocated for relay transmission, or in the acknowledgment zone, or combinations thereof, of the uplink subframe.

* * * * *

UNITED STATES PATENT AND TRADEMARK OFFICE
CERTIFICATE OF CORRECTION

| | | |
|---|---|---|
| PATENT NO. | : 8,175,042 B2 | Page 1 of 1 |
| APPLICATION NO. | : 11/926952 | |
| DATED | : May 8, 2012 | |
| INVENTOR(S) | : Ozgur Oyman et al. | |

It is certified that error appears in the above-identified patent and that said Letters Patent is hereby corrected as shown below:

In column 10, line 18, in Claim 13, delete "apparatus station" and insert -- apparatus --, therefor.

Signed and Sealed this
Tenth Day of July, 2012

David J. Kappos
*Director of the United States Patent and Trademark Office*